United States Patent
Overgaard et al.

(10) Patent No.: US 10,330,057 B2
(45) Date of Patent: Jun. 25, 2019

(54) HOOD INSULATOR HAVING AN INTEGRAL AIR BOX CLOSEOUT FEATURE

(71) Applicant: FORD GLOBAL TECHNOLOGIES, LLC, Dearborn, MI (US)

(72) Inventors: Neil Lawson Overgaard, Ypsilanti, MI (US); Bryn Arthur Davies, Novi, MI (US); Keith Brown, Riverview, MI (US); Martin Hagen, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 15/419,619

(22) Filed: Jan. 30, 2017

(65) Prior Publication Data

US 2018/0216584 A1 Aug. 2, 2018

(51) Int. Cl.
*F02M 35/02* (2006.01)
*F02M 35/04* (2006.01)
(Continued)

(52) U.S. Cl.
CPC ....... *F02M 35/02416* (2013.01); *B60K 13/06* (2013.01); *B60R 13/0838* (2013.01); *B62D 25/105* (2013.01); *F02M 35/0201* (2013.01); *F02M 35/0204* (2013.01); *F02M 35/04* (2013.01); *F02M 35/048* (2013.01); *F02M 35/10242* (2013.01); *F02M 35/161* (2013.01); *B60K 13/02* (2013.01); *B62D 25/12* (2013.01)

(58) Field of Classification Search
CPC ........... F02M 35/0201; F02M 35/0204; F02M 35/04; F02M 35/042; F02M 35/044; F02M 35/048; F02M 35/10006; F02M 35/10013; F02M 35/10242; F02M 35/161; B60K 13/02; B60K 13/06; B62D 25/105; B60R 13/0838
See application file for complete search history.

(56) References Cited

U.S. PATENT DOCUMENTS 1,883,464 A * 10/1932 Ball ..................... F24F 13/1406
                                                              180/69.2
2,701,024 A *  2/1955 Thomas ............... B62D 25/105
                                                               180/68.3
(Continued)

FOREIGN PATENT DOCUMENTS

DE       4123947 A1    1/1993
EP       0419313 B1   11/1992
(Continued)

OTHER PUBLICATIONS

English Machine Translation of EP0419313B1.
(Continued)

*Primary Examiner* — Erick R Solis
(74) *Attorney, Agent, or Firm* — Jason Rogers; Vichit Chea; King & Schickli, PLLC

(57) ABSTRACT

An engine air induction system includes an air box and a hood insulator. The air box has an open top and a perimeter seal extending continuously around the open top. The hood insulator has a body including an air box closeout feature providing a continuous interface with the perimeter seal when a hood assembly incorporating the hood insulator is in a closed position. A related method of sealing an open top on an air box of a motor vehicle is also disclosed.

18 Claims, 6 Drawing Sheets

(51) Int. Cl.
*F02M 35/16* (2006.01)
*B60K 13/06* (2006.01)
*B62D 25/10* (2006.01)
*F02M 35/024* (2006.01)
*F02M 35/10* (2006.01)
*B60R 13/08* (2006.01)
*B60K 13/02* (2006.01)
*B62D 25/12* (2006.01)

(56) References Cited

U.S. PATENT DOCUMENTS

| | | | |
|---|---|---|---|
| 3,641,746 A * | 2/1972 | Smith | F02M 31/066 |
| | | | 123/556 |
| 4,646,864 A | 3/1987 | Racchi | |
| 4,831,981 A * | 5/1989 | Kitano | B60K 11/00 |
| | | | 123/198 E |
| 4,850,444 A | 7/1989 | Bojanowski et al. | |
| 5,022,479 A * | 6/1991 | Kiser | B60K 13/06 |
| | | | 180/68.3 |
| 5,558,176 A | 9/1996 | Petersen et al. | |
| 5,950,753 A | 9/1999 | Muldoon et al. | |
| 6,197,403 B1 | 3/2001 | Brown et al. | |
| 6,514,136 B1 | 2/2003 | Hanaya et al. | |
| 7,523,798 B2 * | 4/2009 | Muramatsu | B60K 11/08 |
| | | | 180/68.1 |
| 8,181,728 B2 * | 5/2012 | Hartland | B60K 11/08 |
| | | | 180/68.1 |
| 9,211,791 B2 | 12/2015 | Laakso et al. | |
| 9,545,844 B2 * | 1/2017 | Forty | B60K 13/02 |
| 2005/0217625 A1 | 10/2005 | Niaken et al. | |
| 2010/0066127 A1 | 3/2010 | Goda et al. | |
| 2013/0065499 A1 * | 3/2013 | Patterson | B60H 1/26 |
| | | | 454/152 |
| 2016/0222927 A1 * | 8/2016 | Kalauch | B60K 13/02 |

FOREIGN PATENT DOCUMENTS

| | | |
|---|---|---|
| EP | 0694426 B1 | 6/1999 |
| JP | 02158419 A | 6/1990 |
| JP | 10324267 A | 12/1998 |
| JP | 2014205412 A | 10/2014 |
| WO | 2013174662 A1 | 11/2013 |

OTHER PUBLICATIONS

English Machine Translation of DE4123947A1.
English Machine Translation of JP2014205412A.
English Machine Translation of JP02158419A.
English Machine Translation of JP10324267A.
Edgar, Julian; "Building and Testing an Airbox"; AutoSpeed; http://www.autospeed.com/cms/article.html?&title=Building-and-Testing-an-Airbox&A=113248; Feb. 9, 2016; pp. 1-10.

* cited by examiner

HOOD INSULATOR HAVING AN INTEGRAL AIR BOX CLOSEOUT FEATURE

TECHNICAL FIELD

This document relates generally to the motor vehicle equipment field and, more particularly, to a hood insulator incorporating an integral air box closeout feature as well as to an engine air induction system including an open top air box and that hood insulator with the air box closeout feature.

BACKGROUND

Some motor vehicles incorporate an engine air induction system with an open air box design in order to provide additional air flow to the engine and increase engine horsepower ratings. In order to achieve the additional airflow, the open air box is designed with an opening on the top of the air box adjacent to the vehicle's sheet metal inner hood panel. When the hood is opened, the top of the air box is also opened providing additional airflow to the engine. This is significant because when a motor vehicle is being rated for horsepower, the hood is open allowing additional airflow through the top of the open air box resulting in additional advertised horsepower of the engine.

Significantly the top of the open air box cannot remain open all the time when the vehicle is being driven as there is a risk for water and dirty air ingestion into the engine which could reduce engine performance or even damage the engine. Thus, the open top of the air box must be closed in some manner during driving conditions.

This document relates to a new and improved engine air induction system incorporating (a) an air box with an open top and a perimeter seal and (b) a hood insulator having a body including an air box closeout feature that provides a continuous interface with the perimeter seal to close the open top of the air box when the hood assembly of the motor vehicle is closed. A new and improved hood insulator with an integral air box closeout feature and a new and improved method of sealing an open top on an air box of a motor vehicle are also provided.

SUMMARY

In accordance with the purposes and benefits described herein, a hood insulator is provided. That hood insulator comprises a body having an integral air box closeout feature.

The integral air box closeout feature may have a continuous profile. Further, the integral air box closeout feature may define a continuous track forming an uninterrupted interface with the perimeter seal around an open top of an underlying air box.

The body of the hood insulator may include a core enveloped in a cloth scrim. That core may be made from a foam insulating material. In other embodiments, that core may be made from a fiberglass insulating material.

In accordance with an additional aspect, an engine air induction system is provided. That engine air induction system comprises (a) an air box having an open top and a perimeter seal extending continuously around the open top as well as (b) a hood insulator. The hood insulator has a body including an air box closeout feature that provides a continuous interface with the perimeter seal when the hood assembly is closed.

The air box closeout feature may be an integral part of the body. The air box closeout feature may have a continuous profile.

The air box closeout feature may define a continuous track forming an uninterrupted interface with the perimeter seal around the open top of the air box. The body may include a core enveloped in a cloth scrim. The core may be made from a foam insulating material or a fiberglass insulating material.

In accordance with yet another aspect, a method is provided for sealing an open top on an air box of a motor vehicle. That method comprises the steps of: providing a hood assembly with a hood insulator including an integral air box closeout feature and closing the hood assembly whereby the integral air box closeout feature seals the open top of the air box.

The method may further include the step of providing a perimeter seal on the air box surrounding the open top. In addition the method may include the step of including a continuous track on the integral air box closeout feature. Further, the method may include the step of forming an uninterrupted interface between the continuous track and the perimeter seal when the hood assembly is closed.

In the following description, there are shown and described several preferred embodiments of the hood insulator, the engine air induction system and the related method of sealing an open top on an air box of a motor vehicle. As it should be realized, the hood insulator, the engine air induction system and related method are capable of other, different embodiments and their several details are capable of modification in various, obvious aspects all without departing from the hood insulator, the engine air induction system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the hood insulator, the engine air induction system and method of sealing an open top on an air box of a motor vehicle and together with the description serve to explain certain principles thereof.

Reference will now be made in detail to the present preferred embodiments of the hood insulator and the engine air induction system, examples of which are illustrated in the accompanying drawing figures.

DETAILED DESCRIPTION

Figure 1A:
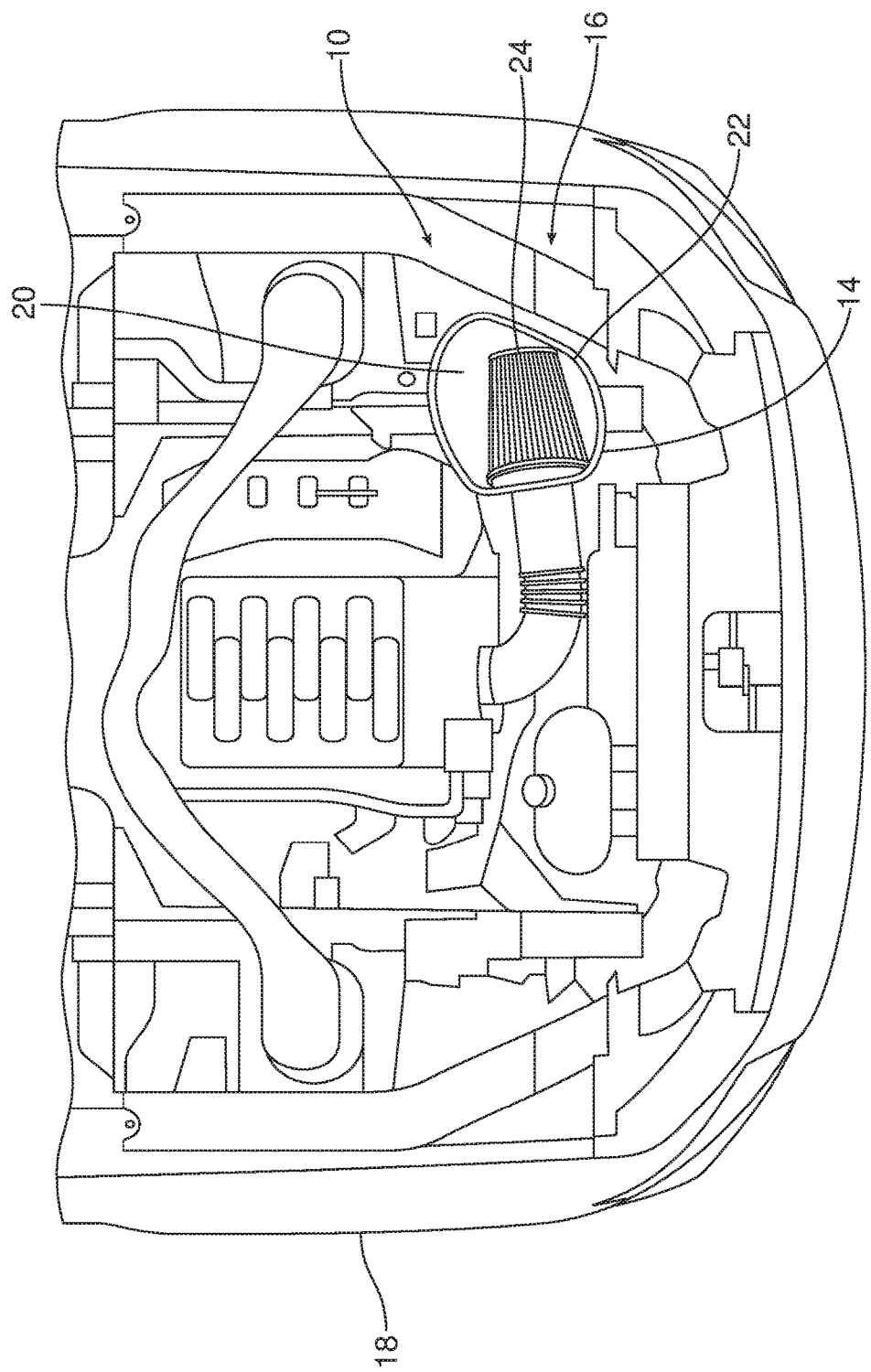
FIG. 1a is a top plan view of an engine compartment of a motor vehicle illustrating the position of the air box of the engine air induction system including, the open top of the air box and the perimeter seal extending around the open top.
Figure 1B:
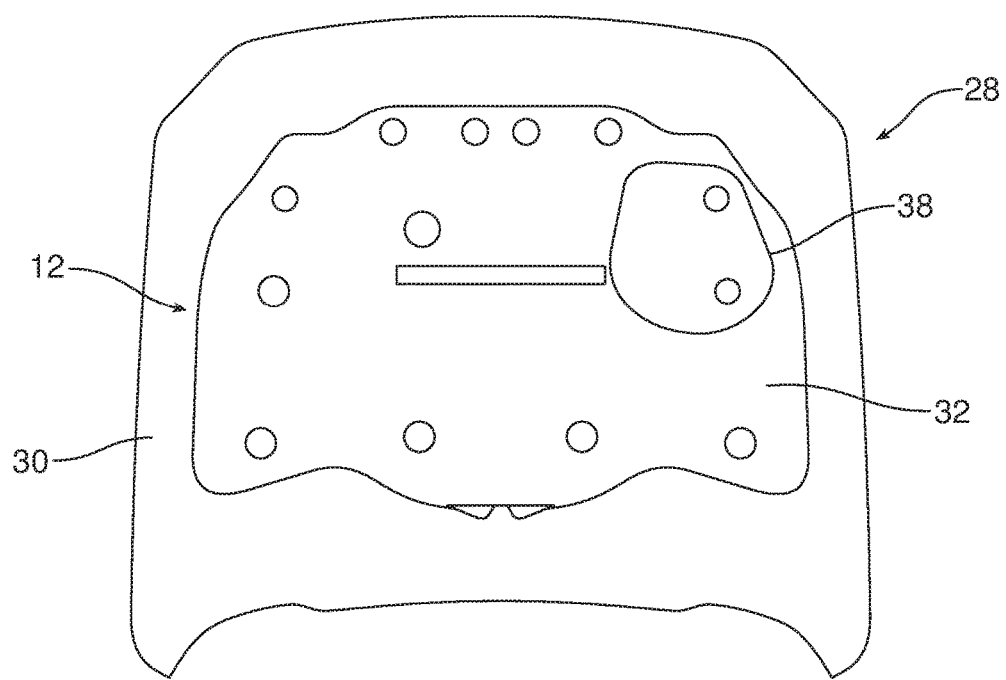
FIG. 1b is a bottom plan view of the hood assembly of the motor vehicle including the hood insulator with the integral air box closeout feature.

Reference is now made to FIGS. 1a, 1b, 2, 3a, 3b and 4 illustrating the new and improved engine air induction system 10 which includes the novel hood insulator 12. As illustrated in FIG. 1a, the engine air induction system 10 includes an air box 14 situated in the engine compartment 16 of a motor vehicle 18. The air box 14 includes an open top 20 and a perimeter seal 22 extending continuously around the open top. The perimeter seal 22 may be made from a flexible polymer material of a type known in the art. A replaceable air filter 24 is received in the air box 14 and overlies or covers the engine air induction inlet 26 (see also FIGS. 3a and 3b).

Figure 4:
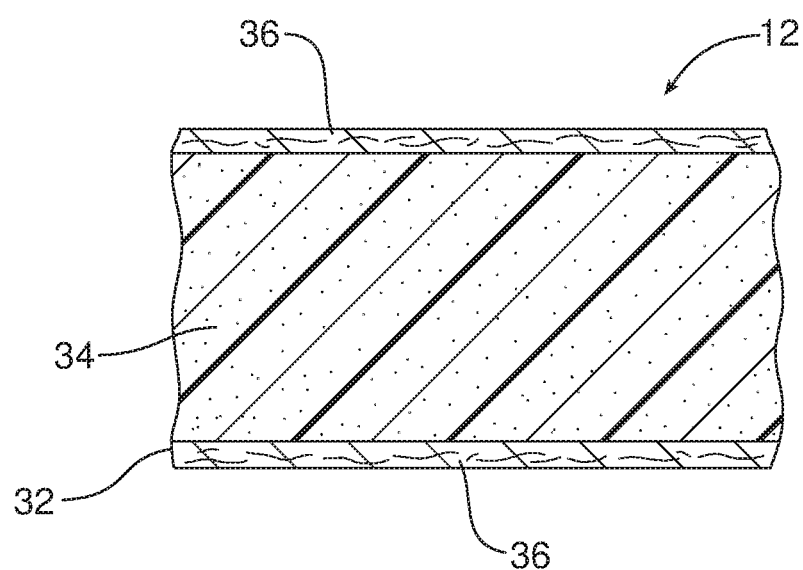
FIG. 4 is a cross sectional view of the hood insulator 12.

FIG. 1a illustrates a hood assembly 28 comprising a sheet metal hood 30 and the hood insulator 12 attached to the underside of the sheet metal hood by retention clips or other means (not shown). As illustrated in FIG. 4, that hood insulator 12 has a body 32 including a core 34 enveloped in a cloth scrim 36. The core 34 may be made from a foam insulating material or a fiberglass insulating material of a type known in the art.

As best illustrated in FIGS. 1b, 2, 3a and 3b, the body 28 of the hood insulator 12 includes an integral air box closeout feature 38. In the illustrated embodiment, the integral air box closeout feature 38 has a continuous profile. In some embodiments, that profile may also be raised. Further, the integral air box closeout feature 38 includes a continuous track 40 that forms an uninterrupted interface 42 with the perimeter seal 22 of the air box 14 around the open top 20 of the underlying air box when the hood assembly 28 is seated in the closed position. This continuous sealing prevents ingestion of water and dirty air through the open top 20 while the motor vehicle 18 is being driven.

Consistent with the above description, a method is provided of sealing the open top 20 on an air box 14 of a motor vehicle 18. That method includes the steps of: (a) providing a hood assembly 28 with a hood insulator 12 including an integral air box closeout feature 38 and closing the hood assembly whereby the integral air box closeout feature seals the open top of the air box. See FIGS. 3a and 3b.

Figure 2:
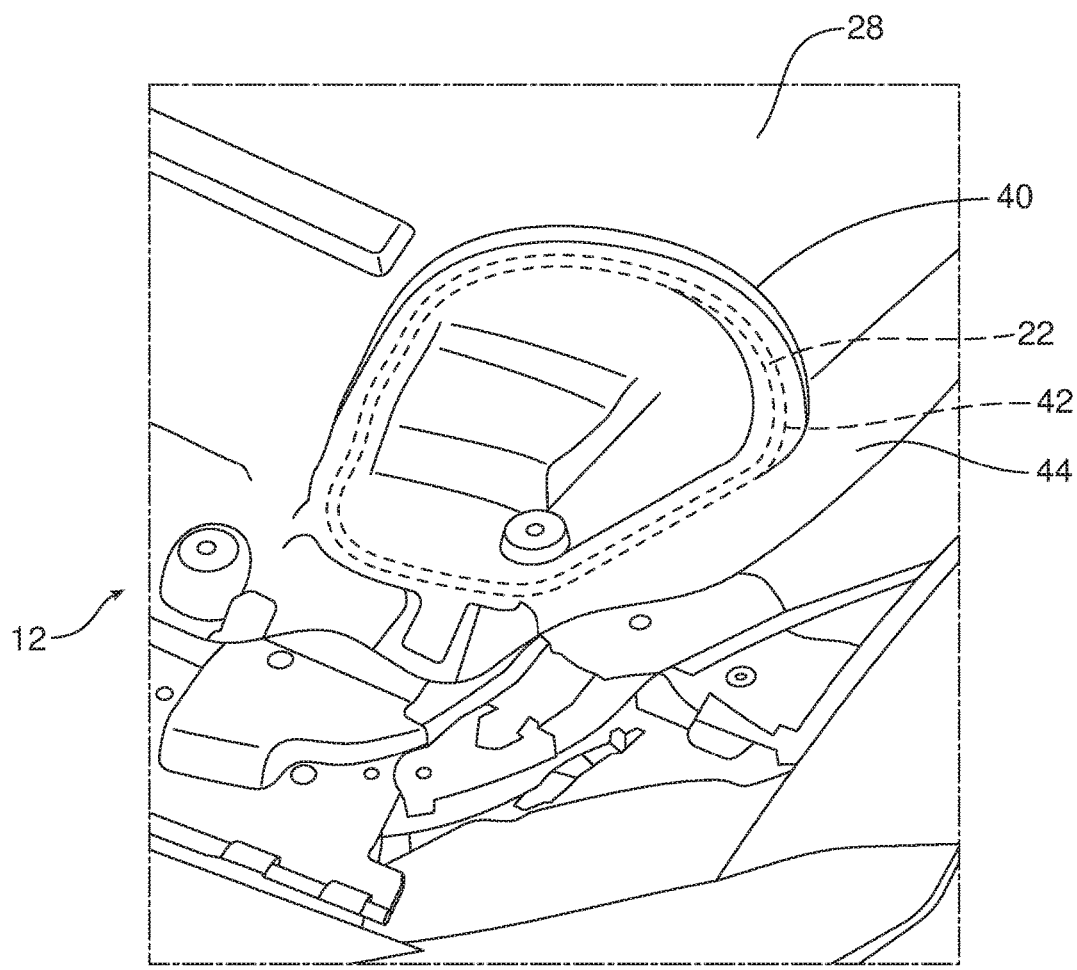
FIG. 2 is a detailed perspective view from above illustrating the B face of the hood insulator including the continuous track that forms the uninterrupted interface (illustrated in phantom line) with the underlying perimeter seal of the air box when the hood assembly is closed.
Figure 3A:
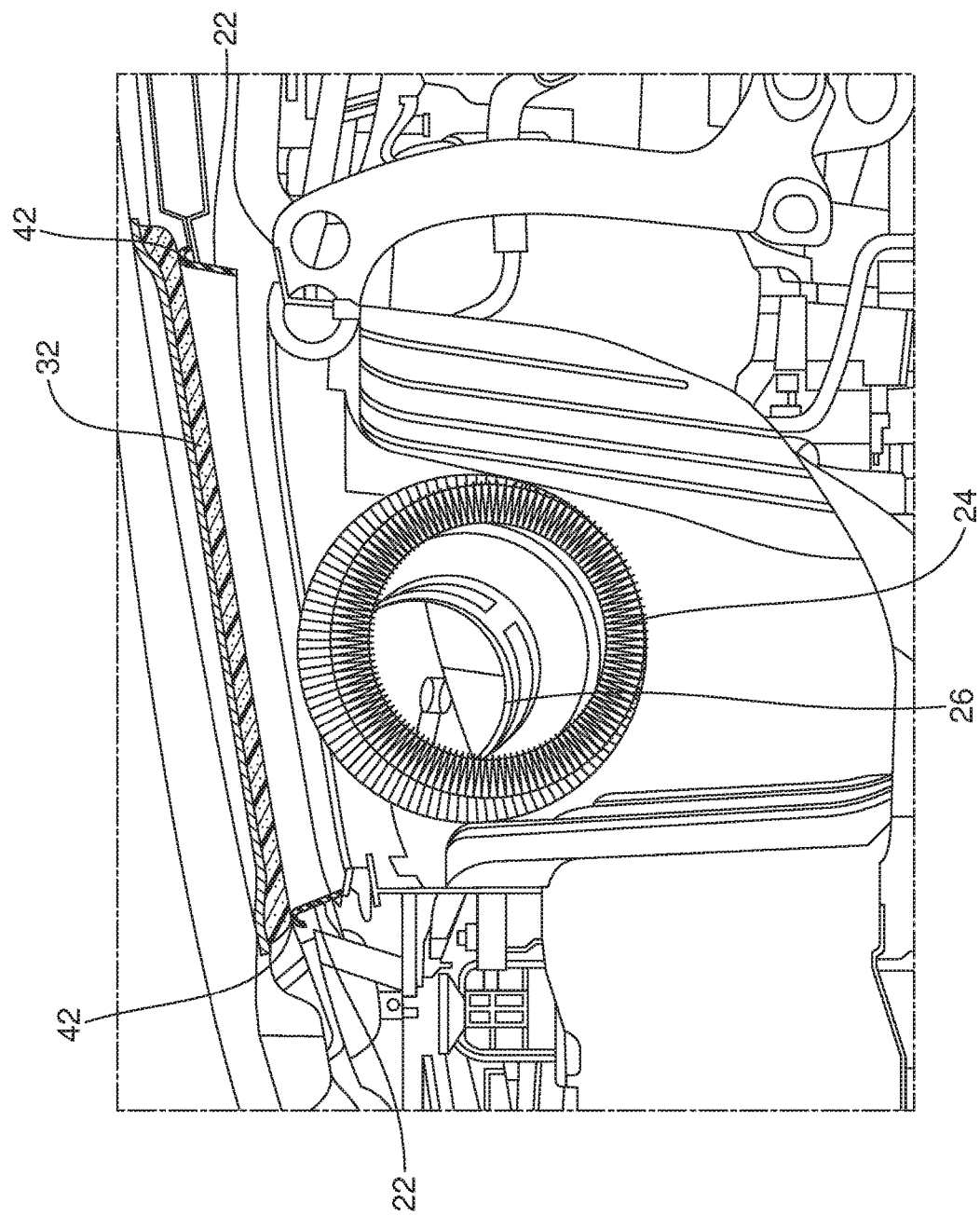
FIG. 3a is a cross sectional view of the engine air induction system illustrating how the air box closeout feature on the hood insulator forms a continuous interface with the perimeter seal extending continuously around the open top of the air box.
Figure 3B:
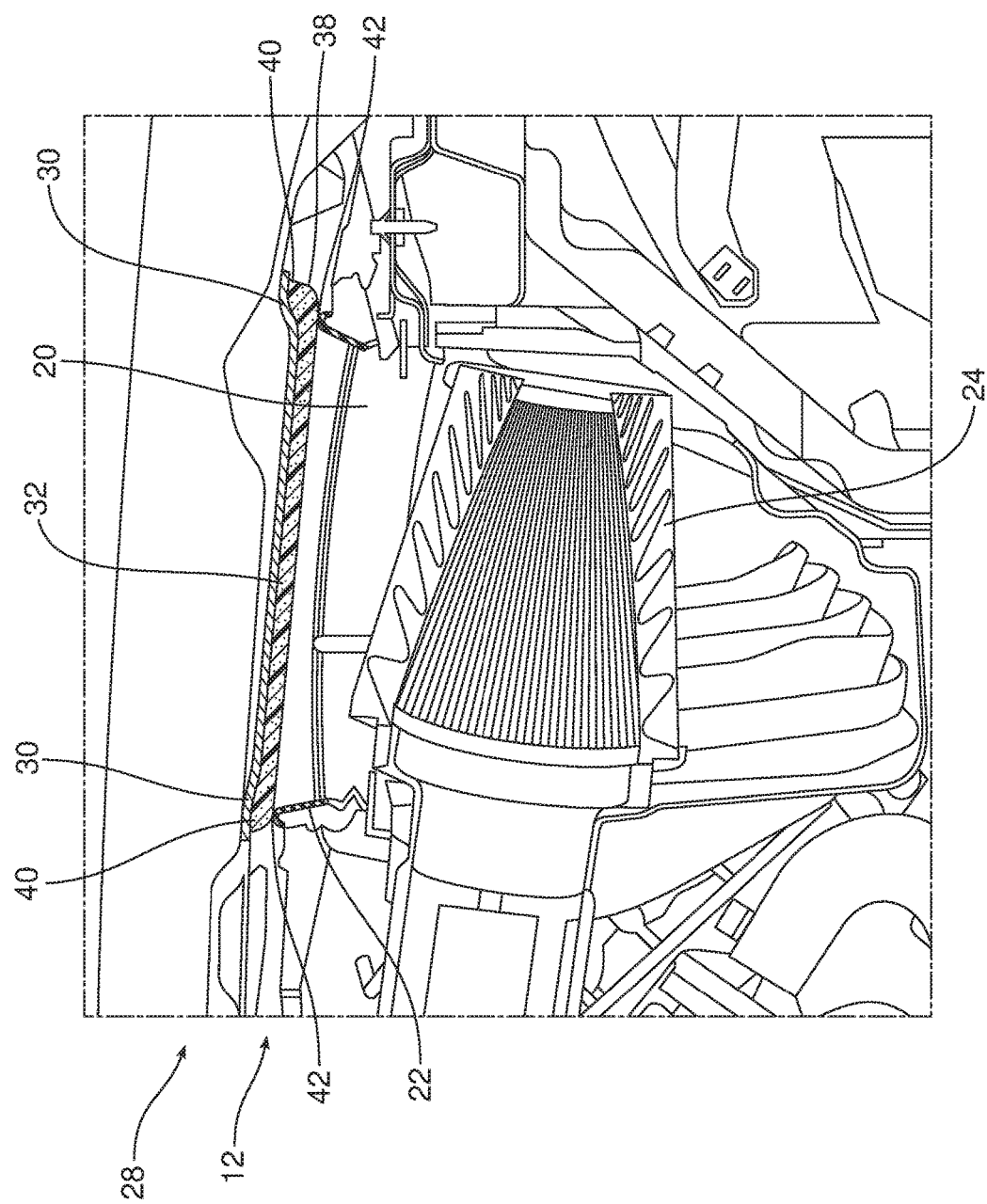
FIG. 3b is a view similar to FIG. 3a but taken along the X axis of the motor vehicle.

The method may further include the step of providing the perimeter seal 22 on the air box 14 surrounding the open top 20. Further, the method may include the step of including a continuous track 40 on the integral air box closeout feature 38. As best illustrated in FIG. 2, that continuous track 40 is provided on the B surface 44 of the hood insulator body 32. When the hood assembly 28 is closed and the integral air box closeout feature 38 engages with and forms the continuous interface 42 with the perimeter seal 22, the continuous track 40 butts against the inner surface of the sheet metal hood 30 providing a back stop to ensure that the necessary pressure is provided at the continuous interface for a seal of high integrity. Thus, it should be appreciated that the method also includes the step of forming the uninterrupted interface 42 between the integral air box closeout feature 38 and the perimeter seal 22 when the hood assembly 28 is closed.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A hood insulator for sealing an open top on an air box of a motor vehicle, comprising:
    a body having an integral air box closeout feature,
    whereby the integral air box closeout feature closes the open top of the air box when a hood of the motor vehicle is closed to prevent air from passing through the open top of the air box.

2. The hood insulator of claim 1, wherein said integral air box closeout feature has a continuous profile.

3. The hood insulator of claim 2, wherein said integral air box closeout feature includes a continuous track forming an uninterrupted interface with a perimeter seal around the open top of the air box.

4. The hood insulator of claim 3, wherein said body includes a core enveloped in a cloth scrim.

5. The hood insulator of claim 4, wherein said core is made from a foam insulating material.

6. The hood insulator of claim 5, wherein said core is made from a fiberglass insulating material.

7. An engine air induction system, comprising:
    an air box having an open top and a perimeter seal extending continuously around said open top; and
    a hood insulator having a body including an air box closeout feature providing a continuous interface with said perimeter seal to close the open top of the air box.

8. The engine air induction system of claim 7, wherein said air box closeout feature is an integral part of said body.

9. The engine air induction system of claim 8, wherein said air box closeout feature has a continuous profile.

10. The engine air induction system of claim 9, wherein said air box closeout feature defines a continuous track forming an uninterrupted interface with said perimeter seal around said open top of said air box.

11. The engine air induction system of claim 10, wherein said body includes a core enveloped in a cloth scrim.

12. The engine air induction system of claim 11, wherein said core is made from a foam insulating material.

13. The engine air induction system of claim 12, wherein said core is made from a fiberglass insulating material.

14. The engine air induction system of claim 13, further including a replaceable air filter overlying an engine air induction inlet.

15. A method of sealing an open top on an air box of a motor vehicle, comprising:
    providing a hood assembly with a hood insulator including an integral air box closeout feature; and
    closing said hood assembly whereby said integral air box closeout feature seals the open top of the air box to prevent air from passing through the open top of the air box.

16. The method of claim 15, further including providing a perimeter seal on said air box surrounding said open top.

17. The method of claim 16, further including providing a continuous track on said integral air box closeout feature.

18. The method of claim 17, further including forming an uninterrupted interface between said integral air box closeout feature and said perimeter seal when said hood assembly is closed.

* * * * *